United States Patent
Nakagiri

[19]
[11] Patent Number: 5,923,446
[45] Date of Patent: Jul. 13, 1999

[54] IMAGE PROCESSING APPARATUS AND METHOD FOR COLOR MATCHING

[75] Inventor: Koji Nakagiri, Kawasaki, Japan

[73] Assignee: Canon Kabushiki Kaisha, Tokyo, Japan

[21] Appl. No.: 08/434,844

[22] Filed: May 4, 1995

[30] Foreign Application Priority Data

May 11, 1994 [JP] Japan .................................. 6-097515

[51] Int. Cl.⁶ ...................................................... H04N 1/46
[52] U.S. Cl. ........................................... 358/520; 395/109
[58] Field of Search .................................... 395/131, 109; 358/502, 520; 345/431, 2

[56] References Cited

U.S. PATENT DOCUMENTS

| | | | |
|---|---|---|---|
| H1506 | 12/1995 | Beratta | 345/199 |
| 5,333,243 | 7/1994 | Best et al. | 395/109 |
| 5,384,901 | 1/1995 | Glassner et al. | 395/131 |
| 5,416,890 | 5/1995 | Beratta | 395/131 |
| 5,481,655 | 1/1996 | Jacobs | 395/109 |
| 5,500,921 | 3/1996 | Ruetz | 395/109 |
| 5,510,910 | 4/1996 | Bockman et al. | 358/502 |
| 5,537,228 | 7/1996 | Dillinger | 358/502 |
| 5,579,031 | 11/1996 | Liang | 345/154 |
| 5,583,666 | 12/1996 | Ellson et al. | 358/518 |

*Primary Examiner*—Mark R. Powell
*Attorney, Agent, or Firm*—Fitzpatrick, Cella, Harper & Scinto

[57] ABSTRACT

An image processing apparatus and method performing color matching between display units and printers by correcting a color system in an operating system when displaying data on the display units, so that the color system in the operating system is converted to match the color system reproduced by the printers. The correction is performed by selecting correction data from a correction data table, and by applying approximation to the selected data. The correction table stores representative colors in the form of correction data for color matching between the display units and the printers. Correcting the color data in a host system in accordance with the color output characteristics of the printers when displaying an image on the display units based on the color data makes it possible to achieve high accuracy color matching of the color displayed by the display units with the color printed by the printers.

13 Claims, 7 Drawing Sheets

| CORRECTION DATA | IMAGE DATA |

FIG. 7

IMAGE PROCESSING APPARATUS AND METHOD FOR COLOR MATCHING

BACKGROUND OF THE INVENTION

1. Field of the Invention

The present invention relates to an image processing apparatus and method appropriate, for example, for color matching processing between display units and printers based on correction of displayed color.

2. Description of Related Art

Generally, an RGB (Red, Green and Blue) colorimetric system is used for display units, and a CMY(K) (Cyan, Magenta, Yellow and (Black)) colorimetric system is used for printers. In a system such as a host system, data which are created or acquired by application software or image scanners are usually stored in the form of the RGB colorimetric data. Display units perform color display based on the RGB colorimetric data, whereas printers perform color printing after converting the RGB colorimetric data into CMY(K) colorimetric data.

Thus, conventional color matching processings between display units and printers depend on a manner in which colors represented in terms of RGB in systems are converted to colors represented in terms of CMY(K). In a practical conversion method generally used, the entire color system expressed by the RGB colorimetric system in an operating system is assigned to a color system reproducible by a printer.

In the conventional method, display units individually reproduce colors, and printers also separately reproduce colors on the basis of the color data in the operating system. The color matching between the color displayed on the display units and the color printed by the printers is carried out depending only on the color outputted by the printers.

The color reproducible power of the display units and that of the printers, however, considerably differ in practice, and the reproducible color system is usually narrower in the printers than in the display units. Consequently, there are some colors that cannot be reproduced by the printers among the colors displayed on the display units. In addition, there are some cases where a color identically expressed in the operating system is displayed in different colors on the display units. Thus, a problem arises that high accuracy color matching is rather difficult in the conventional method.

SUMMARY OF THE INVENTION

Therefore, a first object of the present invention is to provide an image processing apparatus and method that can achieve accurate color matching between color monitors and color image forming apparatus.

A second object of the present invention is to provide an image processing method which can perform color matching by correcting input colors.

A third object of the present invention is to provide a color correction method which makes possible appropriate and high speed color matching processing between color display units and color printers.

In a first aspect of the present invention, there is provided an image processing apparatus, to which a plurality of color monitors and a plurality of color image forming units can be connected for generating a color image based on color data, the image processing apparatus comprising:

storing means for storing a plurality of correction data sets, each of the correction data sets corresponding to one of combinations of the color monitors and the color image forming units;

selecting means for selecting a designated correction data set from the plurality of correction data sets stored in the storing means; and correcting means for correcting the color data by the correction data set selected by the selecting means.

In a second aspect of the present invention, there is provided an image processing method for generating a color image based on input color data, the image processing method comprising the steps of:

storing a plurality of correction data sets, each of the correction data sets corresponding to one of combinations of color monitors and color image forming units;

selecting a designated correction data set from the plurality of correction data sets; and correcting the input color data by the correction data set selected.

Here, the step of correcting may comprise:

a first step of deciding a location of the input color data in a color system which is divided into rectangular solids, the location being one of positions in a rectangular solid, on a surface of the rectangular solid, on an edge of the rectangular solid, and on a vertex of the rectangular solid;

a second step of selecting four vertices among eight vertices defining the rectangular solid when the input color data is located in the rectangular solid, of selecting three vertices among four vertices defining the surface when the input color data is located on the surface, of selecting two vertices at the ends of the edge when the input color data is located on the edge, and of selecting the vertex when the input color data is located on the vertex;

a third step of reading correction data from a correction data table, the correction data corresponding to the vertices or the vertex selected in the second step, the correction data being prepared in advance associated with individual vertices in the color system; and a fourth step of obtaining correction data of the input color data in accordance with the correction data read from the correction data table.

The second step may comprise the steps of:

obtaining a first vertex closest to the location of the input color data in the color system among the eight vertices defining the rectangular solid when the input color data is located in the rectangular solid, and obtaining a second vertex closest to the location of the input color data among the four vertices defining the surface when the input color data is located on the surface; and obtaining three vertices adjacent to the first vertex among seven vertices other than the first vertex when the input color data is located in the rectangular solid, and two vertices adjacent to the second vertex among three vertices other than the second vertex when the input color data is located on the surface.

The fourth step may comprise the steps of:

selecting a set of independent three vectors formed by the four vertices selected when the input color data is in the rectangular solid, and a set of independent two vectors formed by the three vertices selected when the input color data is on the surface of the rectangular solid;

representing coordinates of the location of the input color data in the color system by the set of the independent vectors; and obtaining correction data of the input color data by using the coordinates and the correction data read from the correction data table.

The step of obtaining correction data of the input color data may obtain the correction data by applying interpolation to the correction data read from the correction data table, the interpolation being applied to the correction data of the coordinates of the location of the input color data and correction data of coordinates adjacent to the coordinates in the color system.

The interpolation may be a liner interpolation.

The correction data of the input color data may be supplied to a display unit after the correction data of the input color data are obtained on the basis of correction data obtained as a result of color matching between color which is to be displayed by a display unit and color which is to be formed by a color image forming apparatus.

Contents of the correction data table may be changed in accordance with a combination of a display unit for displaying the color data and a color printer for printing the color data in a system including a plurality of display units and a plurality of printers.

In a third aspect of the present invention, there is provided a network system, to which a host system, a plurality of color monitors, and a plurality of color image forming units are connected, the host system comprising:

storing means for storing a plurality of correction data sets, each of the correction data sets corresponding to one of combinations of the color monitors and the color image forming units;

selecting means for selecting a designated correction data set from the plurality of correction data sets stored in the storing means; and correcting means for correcting the color data by the correction data set selected by the selecting means.

A network system may further comprise output means for outputting corrected color data to the plurality of color monitors.

According to the present invention, color matching between color monitors and color image forming apparatuses can be accurately performed.

In addition, color matching based on correction of the input color data is possible.

Further more, accurate and high speed color matching can also be achieved in a system having a plurality of color displays and a plurality of color printers.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

In the embodiment described in detail below, it is assumed that the color system in an operating system corresponds to a color system reproducible by printers, and the color matching between display units and printers is achieved by correcting the color system in the operating system so that it matches with the color system reproducible by the printers when displaying color data to the display units. The correction is carried out by using a correction data table which stores a plurality of representative colors in the form of correction data for color matching between the display units and printers. Specifically, the correction is performed by selecting correction data of the representative colors from the correction data table, and by applying approximation (interpolation) to the selected correction data.

Figure 1:
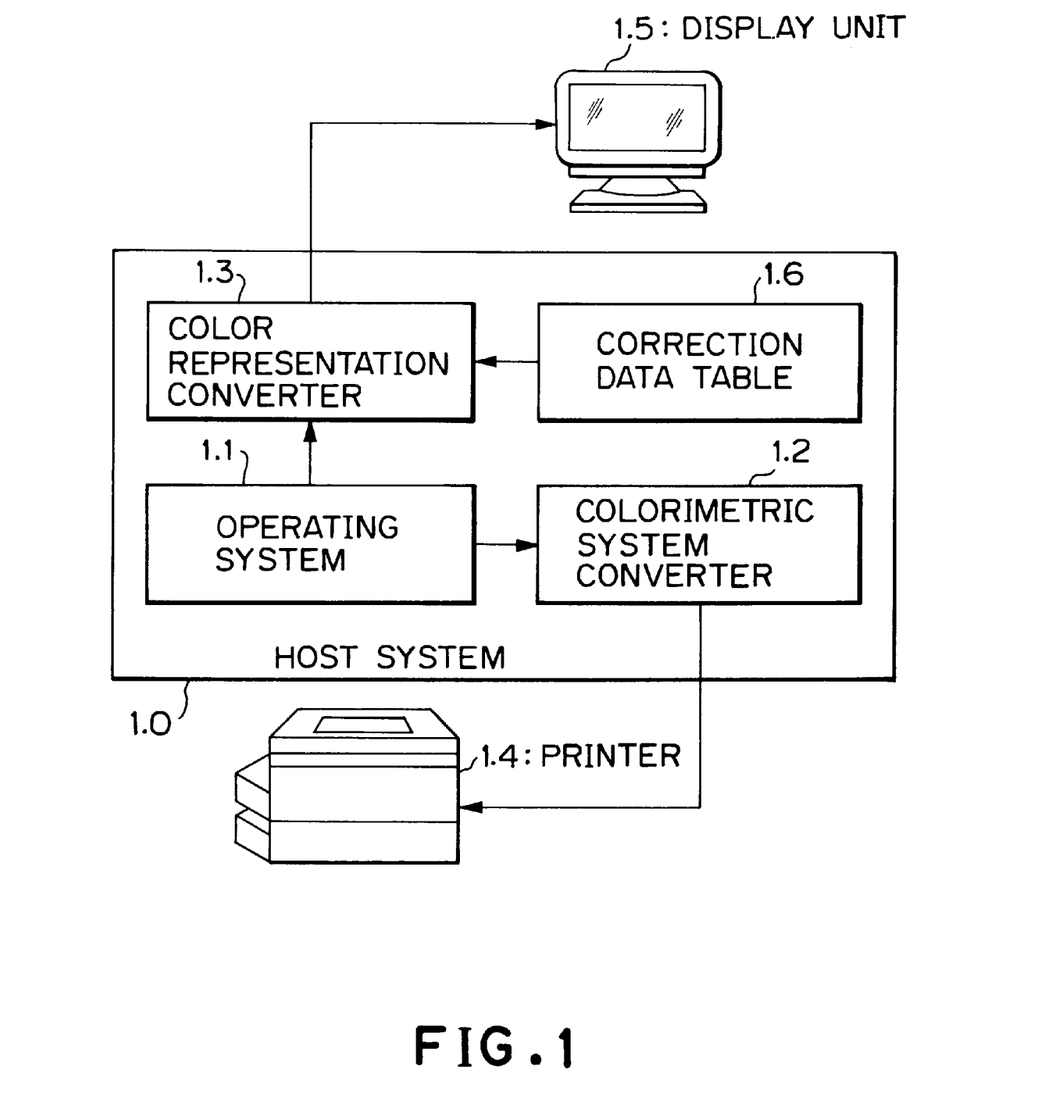
FIG. 1 is a block diagram showing a first embodiment of an image processing apparatus in accordance with the present invention.

FIG. 1 is a block diagram showing an embodiment of an image processing apparatus in accordance with the present invention. In this embodiment, colors displayed on a display unit 1.5 and colors printed by a printer 1.4 originate from color representation in an operating system 1.1 of a host system 1.0. The operating system 1.1 acquires input image data from an external input device, edits the data, and generates image data.

The color representation in the system of this embodiment also employs the RGB colorimetric system.

It is assumed that the color representation in the system is given by $$s=(R_s, G_s, B_s) \quad (1)$$

where s is a three-dimensional vector in the RGB system.

In this embodiment, it is still possible to employ a conventional color conversion method using the vector s in equation (1). More specifically, the conventional method performs display by using values of the individual elements of the vector s, and at the same time performs printing by using color data generated by a colorimetric system converter 1.2 which carries out the following conversion F in equation (2).

$$p=F(s) \text{ where } p=(C,M,Y,(K)) \quad (2)$$

Thus, the color representation for the printer 1.4 is obtained as a three (four) dimensional vector in the CMY(K) system.

The conversion of equation (2) can also be achieved in the printer 1.4 after transferring color information represented in the RGB colorimetric system from the host system 1.0 to the printer 1.4, depending on the instruction system of the printer 1.4.

The present embodiment performs, in addition to the conventional method, correction of the displayed color by a color representation converter 1.3 so that the displayed color approaches the printed color.

The color representation converter 1.3 uses a correction data table 1.6 including a corresponding list between the color representation in the form of vector s and color representation in the form of vector d actually used for the display. This means that the color represented by the vector s in the operating system 1.1 is converted to the vector p by the colorimetric system converter 1.2, and at the same time, the resultant printed color on the printer 1.4 is reproduced on the display unit 1.5 by the vector d.

Next, the correction data table 1.6 will be explained. It is assumed that an arbitrary color representation (vector s) in the operating system 1.6 is expressed as $$s_0=(R_{s0},G_{s0},B_{s0}) \qquad (3)$$

The vector $s_0$ is converted by the colorimetric system converter 1.2 to obtain the output of the printer 1.4. The color of the output is reproduced on the display unit 1.5 by adjusting the R, G and B values for the display unit 1.5 If the matched color representation is given by $$d_0=(R_{d0},G_{d0},B_{d0}) \qquad (4)$$

the relationship $$s_0 \text{ versus } d_0 \qquad (5)$$

is registered as one element of the correction table 1.6.

Figure 2:
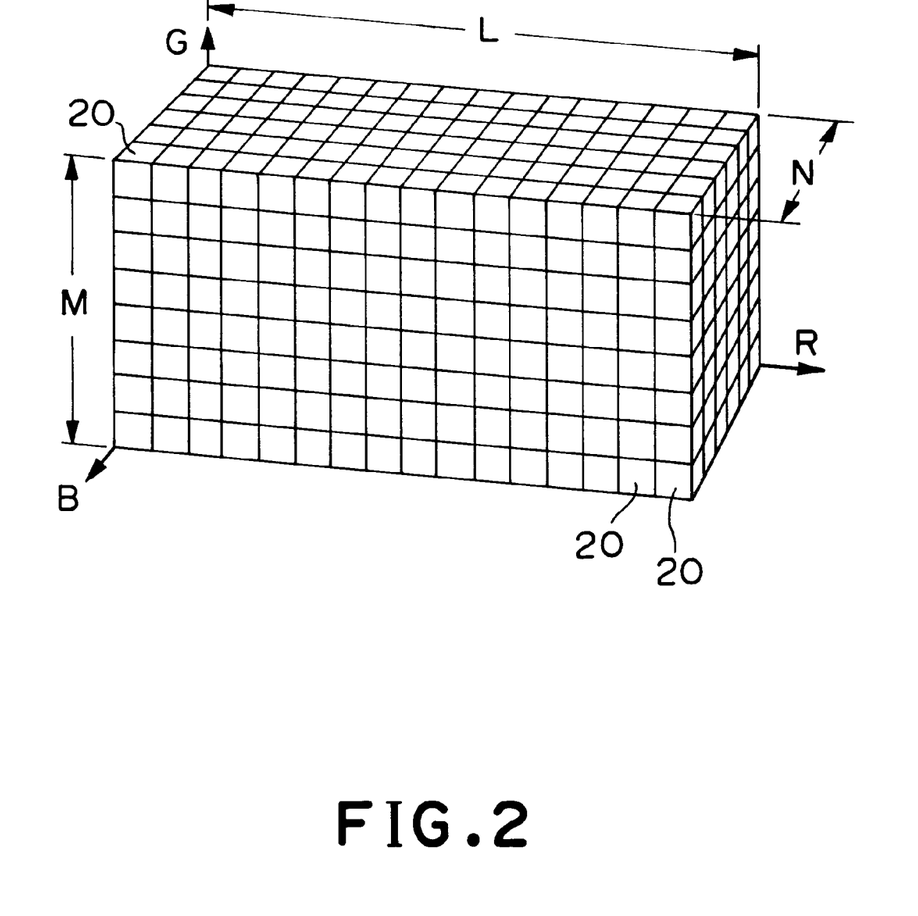
FIG. 2 is a perspective view illustrating an RGB color system.

FIG. 2 is a conceptual perspective view of the RGB color system in the host system 1.0. The space is divided into L, M and N elements along respective axes of R, G and B, so that the total of ((L+1)(M+1)(N+1)) lattice points, and the total of LMN rectangular solids 20 are formed in the RGB color system. The relationships of equation (5) are obtained for individual lattice points, and are stored in the correction data table 1.6. In other words, individual lattice points, that is, individual representative points have their own correction data, and correction data of any input color data are obtained by applying interpolation to the correction data of representative points adjacent to the input color data as described later.

The numbers L, M and N are set appropriately in accordance with the colorimetric power of a means that reproduces on the display unit 1.5 the color corresponding to the printed results. For example, when the color matching is carried out by visual inspection, values are set which provide the identical color under the visual inspection. Other objective means can also be used to carry out the color matching instead of the visual inspection.

Figure 3:
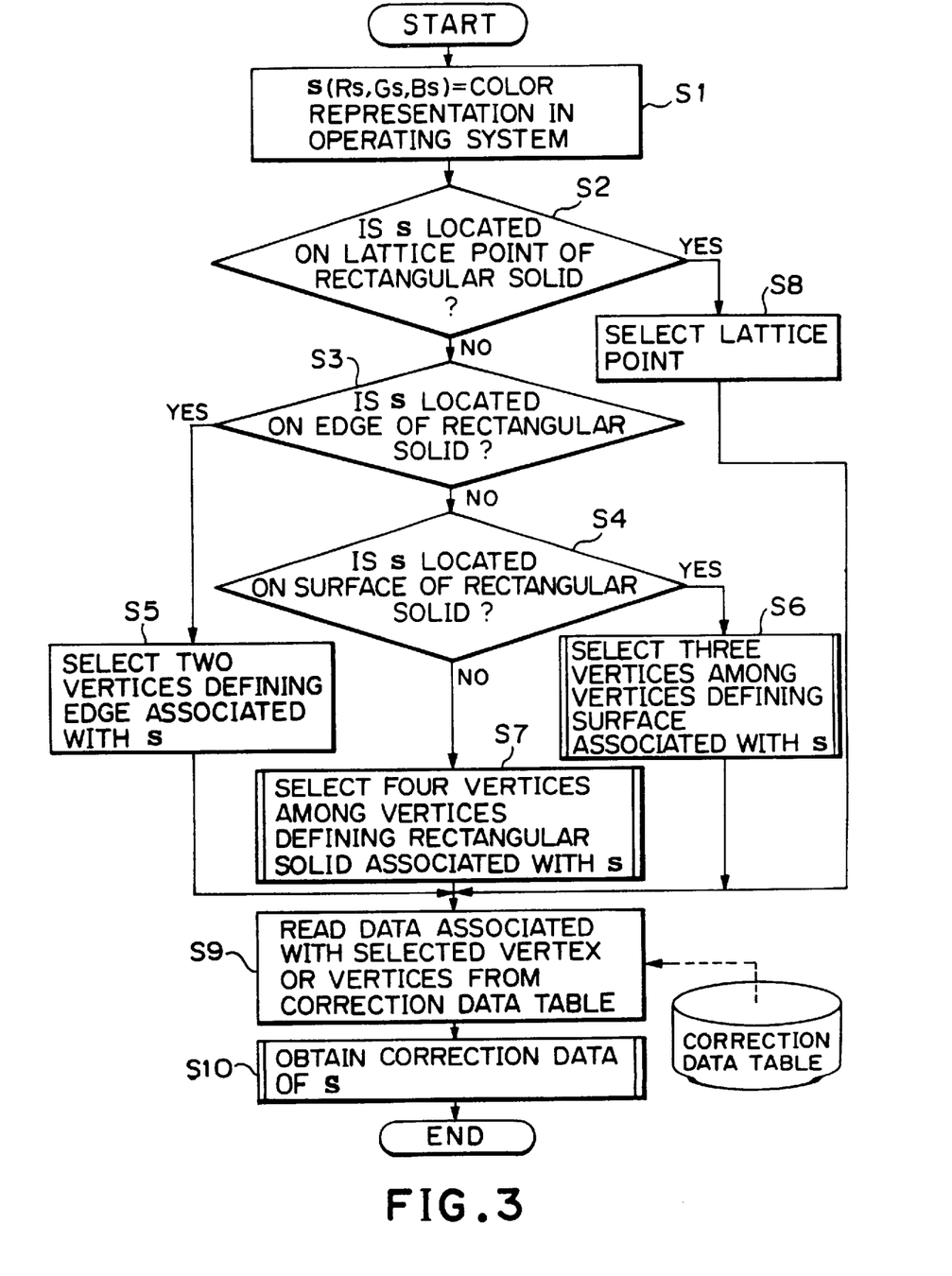
FIG. 3 is a flowchart showing processing procedures in a color representation converter of FIG. 1.

FIG. 3 is a flowchart showing processing procedures in the color representation converter 1.3. The processing procedures are stored in a ROM (not shown in the figure) in the color representation converter 1.3.

First, the color in the system is assumed to be expressed by equation (1). The processing is roughly divided into four subprocessings in accordance with the position of the vector s in a rectangular solid 20 in the RGB system as shown in FIG. 2.

1.) When the top of the vector s is located on a lattice point of the rectangular solid 20 (step S2).

Figure 4A:
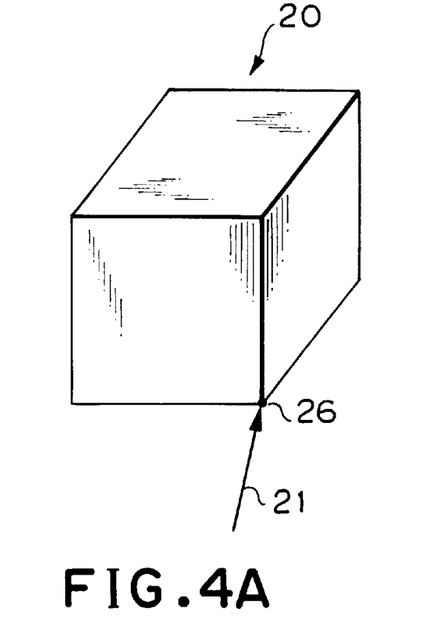
FIGS. 4A–4D are schematic diagrams showing interpolation processings in the first embodiment.

A vector 21 in FIG. 4A illustrates this. In this case, correction data (vector d) corresponding to the color of the lattice point (vector s) is read from the correction data table 1.6 at steps S8 and S9, and this vector d is used as the correction data of the vector s at step S10.

2.) When the top of the vector s is located on an edge of the rectangular solid 20 (step S3).

Figure 4B:
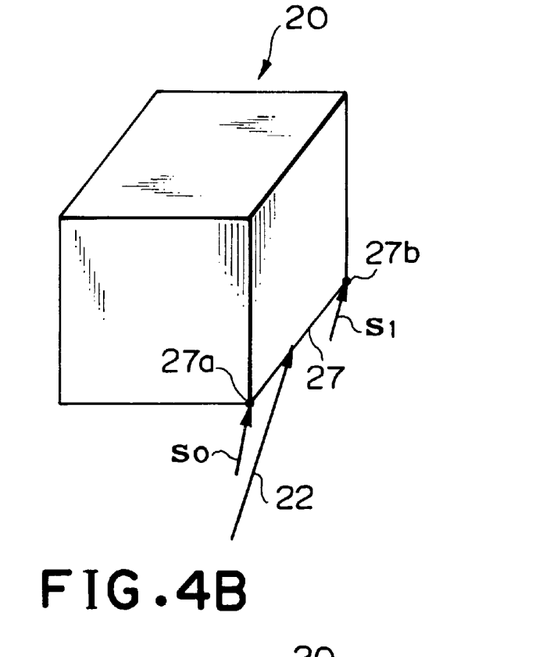

A vector 22 in FIG. 4B illustrate this. Since the vector 22 indicates an interior point on the edge 27, the vector 22 can be expressed by the following equation by using the vertex data (that is, vectors $s_0$ and $s_1$) of the ends 27a and 27b of the edge 27.

$$s=s_0+x(s_1-s_0) \qquad (6)$$

The value x (0<x<1) that satisfies this equation can be uniquely determined. Taking account of this, the correction data (vector d) of the vector s can be obtained by reading the vectors $d_0$ and $d_1$, which are the correction data corresponding to the vectors $s_0$ and $s_1$, from the correction data table 1.6 at steps S5 and S9, and by applying the following equation (that is, by performing interpolation) to the read data at step S10.

$$d=d_0+x(d_1-d_0) \qquad (7)$$

3.) When the top of the vector s is located on a surface of the rectangular solid 20 (step S4).

Figure 4C:
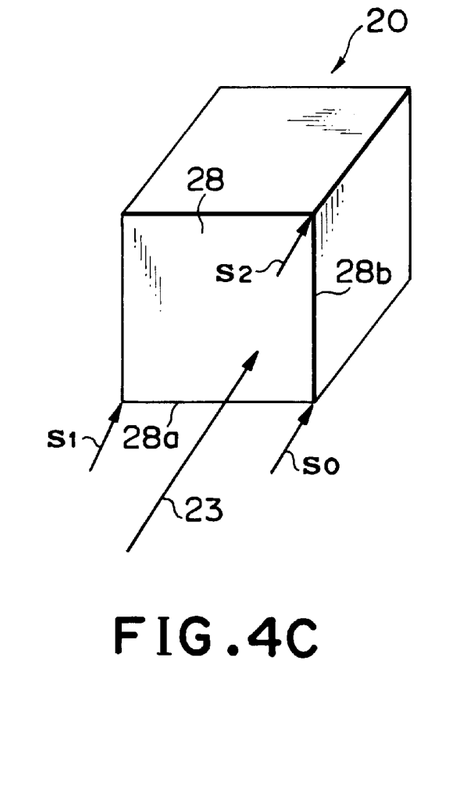

A vector 23 of FIG. 4C illustrates this. The correction data (vector d) can be obtained as follows. First, The lattice point (represented by vector $s_0$) closest to the point represented by the vector s among the four lattice points on the plane of the rectangular solid 20, which includes the top of the vector s, is selected, followed by the selection of two vectors $s_1$ and $s_2$ linked with the vector $s_0$ through edges 28a and 28b. Second, values x and y (0<x<1, and 0<y<1) are obtained by the following equation using the three vectors $s_0$, $s_1$ and $s_2$.

$$s=s_0+x(s_1-s_0)+y(s_2-s_0) \qquad (8)$$

Since vectors $(s_1-s_0)$ and $(s_2-s_0)$ in the right-hand side of equation (8) are independent, the values x and y can be uniquely determined. Finally, the correction data (vector d) corresponding to the vector s can be obtained by reading correction data (vectors $d_0$, $d_1$ and $d_2$) corresponding to the vectors $s_0$, $s_1$ and $s_2$, respectively, from the correction data table 1.6 at steps S6 and S9, and by applying the following equation (that is, by performing interpolation) to the read data at step S10.

$$d=d_0+x(d_1-d_0)+y(d_2-d_0) \qquad (9)$$

4.) When the top of the vector s is located in the rectangular solid 20.

Figure 4D:
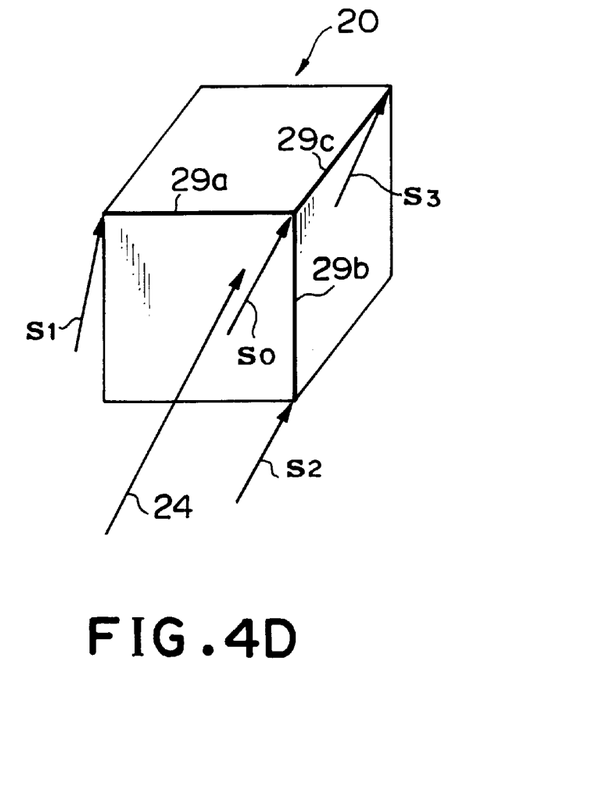

A vector 24 of FIG. 4D illustrates this. The correction data (vector d) can be obtained as follows. First, The lattice point (vector $s_0$) closest to the vector s among the eight lattice points of the rectangular solid 20 including the vector s is determined, followed by the selection of three lattice points (vectors $s_1$, $s_2$ and $s_3$) linked with the lattice point $s_0$ through edges 29a, 29b and 29c. Second, values x, y and z (0<x<1, 0<y<1 and 0<z<0) are obtained by the following equation using the three vectors $s_1$, $s_2$ and $s_3$.

$$s=s_0+x(s_1-s_0)+y(s_2-s_0)+z(s_3-s_0) \qquad (10)$$

Since vectors $(s_1-s_0)$, $(s_2-s_0)$ and $(s_3-s_0)$ in the right-hand side of equation (10) are independent, the values x, y and z can be uniquely determined. Finally, the correction data (vector d) corresponding to the vector s can be obtained by reading correction data (vectors $d_0$, $d_1$, $d_2$ and $d_3$) corresponding to the vectors $s_0$, $s_1$, $s_2$ and $s_3$, respectively, from the correction data table 1.6 at steps S7 and S9, and by applying the following equation (that is, by performing interpolation) to the read data at step S10.

$$d=d_0+x(d_1-d_0)+y(d_2-d_0)+z(d_3-d_0) \tag{11}$$

Although the lattice point closest to the point represented by the vector s is determined among the lattice points of the rectangular solid, and the lattice points linked thereto are selected at steps S6 and S7 to acquire the correction data, the selection method of the lattice points, based on which the correction data are read, may be simplified in the above procedures 3.) and 4.). For example, the lattice point with the least R, G and B coordinate values among the lattice points of the rectangular solid may be used.

Thus, vectors d are produced when outputting the color (vectors s) in the system are displayed. This makes it possible to match the color on the display unit with that outputted to the printer 1.4.

Next, color matching between the displayed color and the printed color in a system having a plurality of display units and a plurality of printers will be described.

Figure 5:
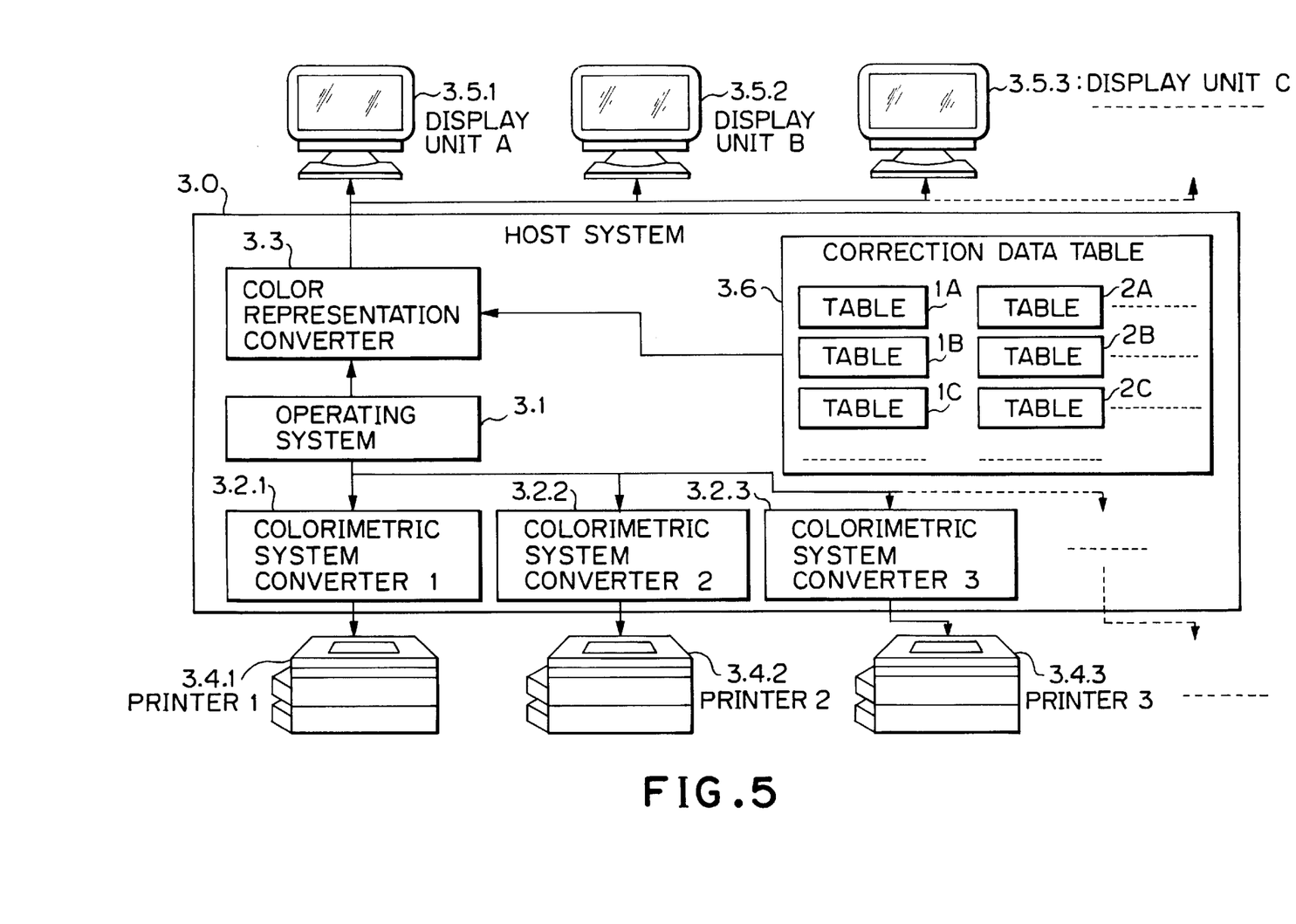
FIG. 5 is a block diagram showing a second embodiment of an image processing apparatus in accordance with the present invention.

FIG. 5 is a block diagram showing a system comprising a plurality of display units and a plurality of printers. As in the system of FIG. 1, that is, as in the first system comprising one display unit and one printer, the RGB data (vectors s) in an operating system 3.1 in a host system 3.0 are converted to the color representation in a printer 3.4.k (k=1, 2 or 3) by a colorimetric converter 3.2.k. In this case, the output is performed by switching the colorimetric converters 3.2.k in accordance with printer used.

The color data for individual display units are also corrected as in the embodiment shown in FIG. 1 by a color representation converter 3.3. In this case, the correction data table 3.6 is switched to select one of its inner tables in accordance with one of the combinations of the display units and the printers in response to a control signal from the operating system 3.1. This makes it possible to achieve the color matching between the displayed color and the printed color in the system comprising a plurality of display units and a plurality of printers.

The operating system 3.1 switches the inner tables of the correction data table 3.6 by automatically identifying ID numbers of the display units and the printers.

Although the above described embodiments correct the displayed color by the monitors in accordance with the printed color, the present invention is not restricted to this. The output color by the printers may be corrected in accordance with the color outputted by the monitors.

According to the present invention, color matching between color monitors and color image forming apparatuses can be accurately performed.

In addition, color matching based on correction of the input color data is possible.

Further more, accurate and high speed color matching can also be achieved in a system having a plurality of color display units and a plurality of color printers.

EMBODIMENT 3

Figure 6:
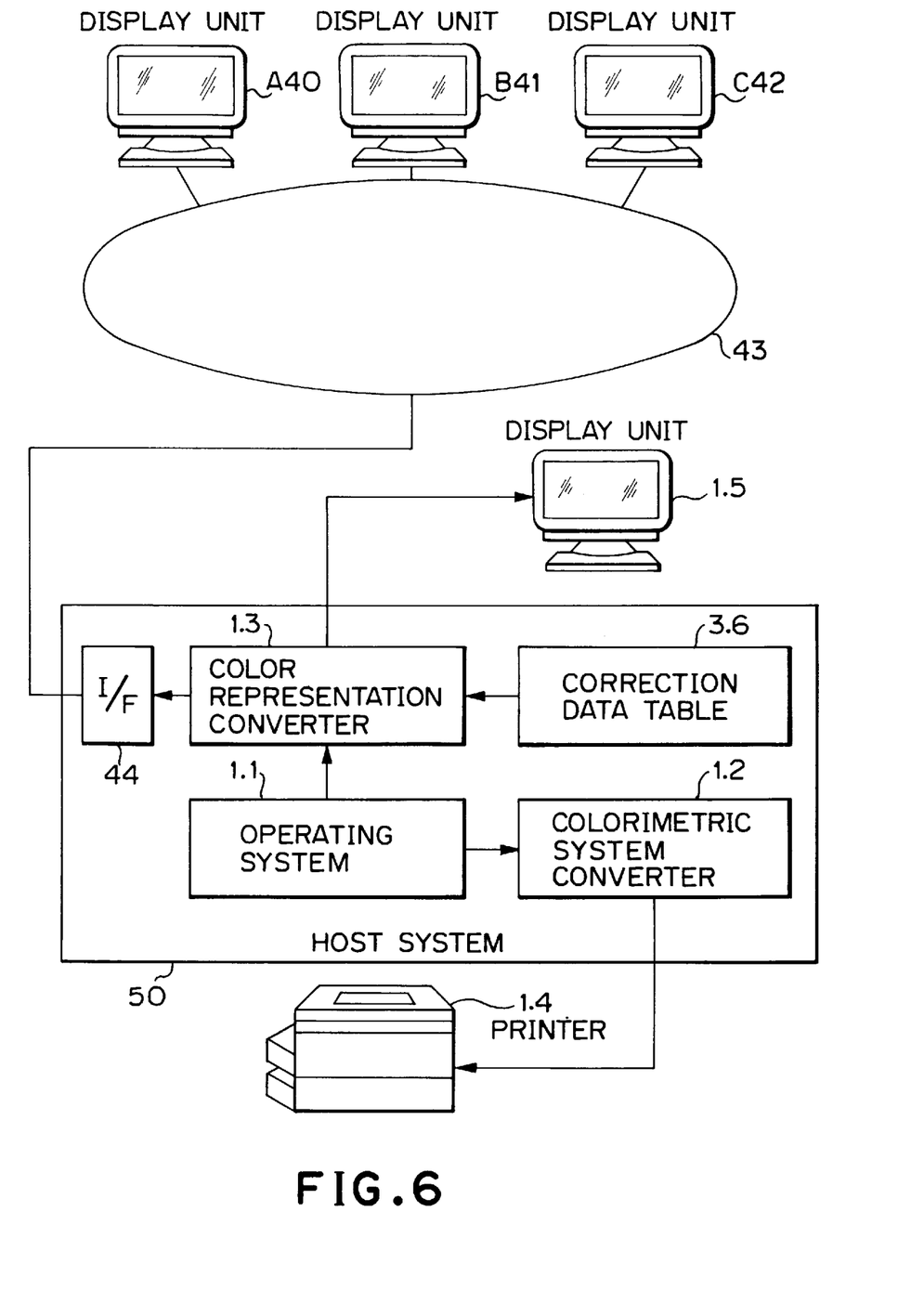
FIG. 6 is a block diagram showing a third embodiment of an image processing apparatus in accordance with the present invention.

A third embodiment in accordance with the present invention will be described referring to FIG. 6. This embodiment applies the host system as shown in FIG. 1 or FIG. 5 to a network. In FIG. 6, the same portions as in FIG. 1 are designated by the same reference numerals, and the description thereof is omitted here.

A display unit A40, a display unit B41, and a display unit C42 are each an intelligent display unit including an image processing apparatus, and are connected to a network 43 such as LAN connected to a host system 50.

A correction data table 3.6 of the host system 50 stores a plurality of correction data associated with combinations of the printer 1.4 and the plurality of display units. An I/F (interface) 44 is provided to connect the host system 50 to the network 43.

The host system 50 of the present embodiment is provided with a broadcasting function which enables the host system 50 to parallelly communicate with the display units A40, B41 and C42 on the network. When the host system transmits image data to the plurality of display units by using the broadcasting function, it converts the image data by using correction data corresponding to respective display units by means of the color representation converter 1.3. Thus, the display units can each display images whose displayed colors agree with each other.

Figure 7:
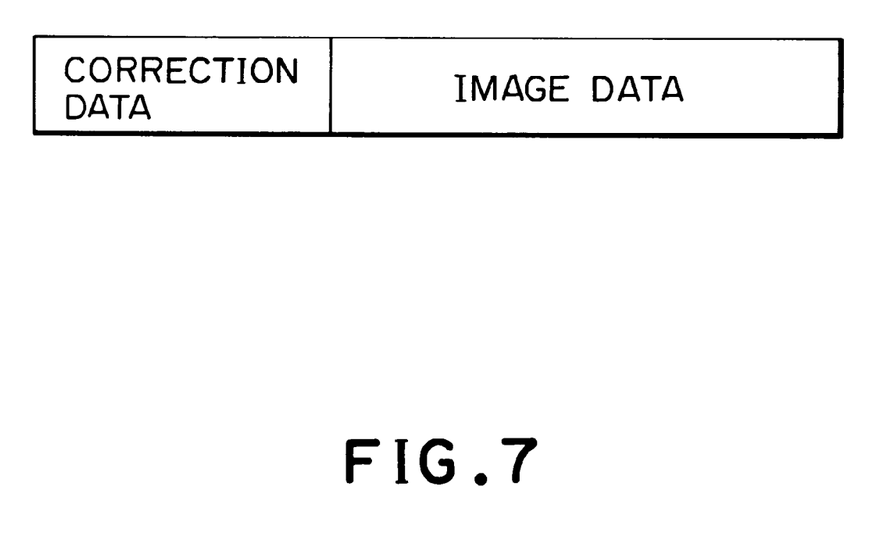
FIG. 7 is a diagram showing transmission data from a host system to terminals in the third embodiment.

Although the image data are color-representation converted in the host system 50 in accordance with the individual display unit in the third embodiment, the host system 50 can transmit to the display units the correction data associated with the individual display units together with the image data during the broadcast, so that each display unit can correct the image data in accordance with the received correction data (see, FIG. 7).

The parallel communications may be implemented either by time division or by providing another channel.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image processing apparatus comprising:

storing means for storing a plurality of correction data tables, each of which corresponds to a different combination of color monitor and color image forming units;

discriminating means for discriminating a kind of color monitor and a kind of color image forming unit which are connected to the image processing apparatus;

selecting means for selecting a correction data table corresponding to a discrimination result obtained by said discriminating means, from among the plurality of correction data tables;

color matching means for color matching color data by using the selected correction data table, wherein color matching processing of the color data to be displayed by the connected color monitor is performed simultaneously with color matching processing of color image data for the connected color image forming unit; and output means for outputting the color data processed by said color matching means.

2. A color image processing method for an image processing apparatus, said method comprising the steps of:

inputting color data;

storing a plurality of correction tables, each of which corresponds to a different combination of color monitor and color image forming units;

discriminating a kind of color monitor and a kind of color image forming unit which are connected to the image processing apparatus;

selecting a correction table in accordance with a discrimination result in said discriminating step; and color matching the input color data in accordance with the selected correction table, wherein color matching processing of the color data to be displayed by the connected color monitor is performed simultaneously with color matching processing of color image data for the connected color image forming unit.

3. A color image processing method as claimed in claim 2, wherein said step of color matching comprises:

a first step of deciding a location of the input color data in a color system which is divided into rectangular solids, the location being one of positions in a rectangular solid, on a surface of the rectangular solid, on an edge of the rectangular solid, and on a vertex of the rectangular solid;

a second step of selecting four vertices among eight vertices defining the rectangular solid when the input color data is located in the rectangular solid, of selecting three vertices among four vertices defining the surface when the input color data is located on the surface, of selecting two vertices at the ends of the edge when the input color data is located on the edge, and of selecting the vertex when the input color data is located on the vertex;

a third step of reading correction data from a correction data table, the correction data corresponding to the vertices or the vertex selected in the second step, the correction data being prepared in advance associated with individual vertices in the color system; and a fourth step of obtaining correction data of the input color data in accordance with the correction data read from the correction data table.

4. The image processing method as claimed in claim 3, wherein said second step comprises the steps of:

obtaining a first vertex closest to the location of said input color data in said color system among the eight vertices defining said rectangular solid when said input color data is located in said rectangular solid, and obtaining a second vertex closest to the location of said input color data among the four vertices defining said surface when said input color data is located on said surface; and obtaining three vertices adjacent to said first vertex among seven vertices other than said first vertex when said input color data is located in said rectangular solid, and two vertices adjacent to said second vertex among three vertices other than said second vertex when said input color data is located on said surface.

5. The image processing method as claimed in claim 3, wherein said fourth step comprising the steps of:

selecting a set of independent three vectors formed by the four vertices selected when said input color data is in said rectangular solid, and a set of independent two vectors formed by the three vertices selected when said input color data is on said surface of said rectangular solid;

representing coordinates of said location of said input color data in said color system by said set of the independent vectors; and obtaining correction data of said input color data by using said coordinates and said correction data read from said correction data table.

6. The image processing method as claimed in claim 5, wherein said step of obtaining correction data of said input color data obtains said correction data by applying interpolation to said correction data read from said correction data table, said interpolation being applied to said correction data of said coordinates of the location of said input color data and correction data of coordinates adjacent to said coordinates in said color system.

7. The image processing method as claimed in claim 6, wherein said interpolation is a liner interpolation.

8. The image processing method as claimed in claim 3, wherein said correction data of said input color data are supplied to a display unit after said correction data of said input color data are obtained on the basis of correction data obtained as a result of color matching between color which is to be displayed by a display unit and color which is to be formed by a color image forming apparatus.

9. The image processing method as claimed in claim 8, wherein contents of said correction data table are changed in accordance with a combination of a display unit for displaying said color data and a color printer for printing said color data in a system including a plurality of display units and a plurality of printers.

10. A color image processing apparatus to which a plurality of units can be connected via a network, the apparatus comprising:

storing means for storing a plurality of correction data, each of which corresponds to a different combination of color monitor and color image forming units;

discriminating means for discriminating a kind of unit connected to said color image processing apparatus;

selecting means for selecting a correction data table corresponding to the kind of unit discriminated by said discriminating means, from among the plurality of correction data; and transfer means for transferring input color data with the selected correction data to the connected color monitor unit via the network.

11. A method for a color image processing apparatus to which a plurality of units can be connected via a network, said method comprising the steps of:

storing a plurality of correction data, each of which corresponds to a different combination of color monitor and color image forming units;

discriminating a kind of unit connected to the color image processing apparatus;

selecting a correction data corresponding to the kind of unit discriminated in said discriminating step, from among the plurality of correction data; and transferring input color data with the selected correction data to the connected color monitor unit via the network.

12. A color image processing apparatus according to claim 10, further comprising:

communication means for performing parallel communication with the plurality of units.

13. An apparatus according to claim 12, further comprising image forming means for forming an image based upon image data stored on a recording medium by using a connected color output unit.

* * * * *

UNITED STATES PATENT AND TRADEMARK OFFICE
CERTIFICATE OF CORRECTION

PATENT NO.    : 5,923,446
DATED         : July 13, 1999
INVENTOR(S)   : KOJI NAKAGIRI Page 1 of 3

It is certified that error appears in the above-identified patent and that said Letters Patent is hereby corrected as shown below:

Title page,

AT [56] REFERENCES CITED

U.S. PATENT DOCUMENTS

Insert:  --5,506,946  4/1996  Bar et al.   395/131--.

AT [56] REFERENCES CITED

Insert:  --FOREIGN PATENT DOCUMENTS
594370A1  4/1994  EPO--;
Insert:  --OTHER DOCUMENTS
Gentile, et al., "A Comparison of techniques for Color Gamut Mismatch Compensation," Journal of Image Technology, vol. 16, no. 5, 10/90, pp. 176-181.
Stone, "Color Gamut Mapping and the Printing of Digital Color Images," ACM Transitions on Graphics, vol. 7, no. 4, 10/88, pp. 249-292.
ColorSync Utilities, Developers Notes, Apple Computer, Inc. 1993, pp. 1-4 to 1-75.
Fraser, Bruce, "Latest CMS Solutions to Prevent Color Nightmares," MacWEEK, v7, n41, pp. 26-28, Oct. 18, 1993.--.

COLUMN 3

Line 43, "Further more," should read --Furthermore,--.

UNITED STATES PATENT AND TRADEMARK OFFICE
CERTIFICATE OF CORRECTION

PATENT NO. : 5,923,446
DATED : July 13, 1999
INVENTOR(S) : KOJI NAKAGIRI

It is certified that error appears in the above-identified patent and that said Letters Patent is hereby corrected as shown below:

COLUMN 4

Line 4, "PREFERRED" should read --THE PREFERRED--.

COLUMN 5

Line 13, "unit 1.5" should read --unit 1.5.--; and
Line 63, "illustrate" should read --illustrates--;.

COLUMN 6

Line 30, "$(s_{2-s0})$" should read --$(s_2-s_0)$--;
Line 46, "The" should read --the--;
Line 52, "0<z<0)" should read --0<z<1)--; and
Line 58, "$(s_{3-s0})$" should read --$(s_3-s_0)$--;.

COLUMN 7

Line 40, "above described" should read --above-described--; and
Line 50, "Further more," should read --Furthermore,--.

UNITED STATES PATENT AND TRADEMARK OFFICE
CERTIFICATE OF CORRECTION

PATENT NO.    : 5,923,446
DATED         : July 13, 1999
INVENTOR(S)   : KOJI NAKAGIRI Page 3 of 3

It is certified that error appears in the above-identified patent and that said Letters Patent is hereby corrected as shown below:

<u>COLUMN 9</u>

Line 48, "comprising" should read --comprises--.

Signed and Sealed this

Fourteenth Day of November, 2000

Attest:

Q. TODD DICKINSON

Attesting Officer        Director of Patents and Trademarks